US012617879B2

(12) United States Patent
Park et al.

(10) Patent No.: US 12,617,879 B2
(45) Date of Patent: May 5, 2026

(54) NEODYMIUM-CATALYZED CONJUGATED DIENE-BASED POLYMER AND RUBBER COMPOSITION COMPRISING SAME

(71) Applicant: LG CHEM, LTD., Seoul (KR)

(72) Inventors: Sung Ho Park, Daejeon (KR); Tae Chul Lee, Daejeon (KR); Su Hwa Kim, Daejeon (KR); Dong Hui Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 761 days.

(21) Appl. No.: 17/794,312

(22) PCT Filed: Sep. 24, 2021

(86) PCT No.: PCT/KR2021/013011

§ 371 (c)(1),
(2) Date: Jul. 21, 2022

(87) PCT Pub. No.: WO2022/065902

PCT Pub. Date: Mar. 31, 2022

(65) Prior Publication Data

US 2023/0076797 A1 Mar. 9, 2023

(30) Foreign Application Priority Data

Sep. 25, 2020 (KR) ........................ 10-2020-0125164

(51) Int. Cl.
*C08F 36/06* (2006.01)
*C08C 2/04* (2006.01)

(52) U.S. Cl.
CPC .................................... *C08F 36/06* (2013.01)

(58) Field of Classification Search
None
See application file for complete search history.

(56) References Cited

U.S. PATENT DOCUMENTS

| | | | |
|---|---|---|---|
| 6,437,205 | B1 | 8/2002 | Miller et al. |
| 6,838,526 | B1 | 1/2005 | Sone et al. |
| 2004/0127665 | A1 | 7/2004 | Balducci et al. |
| 2011/0112261 | A1 | 5/2011 | Viola et al. |
| 2011/0184137 | A1 | 7/2011 | Qin et al. |

(Continued)

FOREIGN PATENT DOCUMENTS

| | | |
|---|---|---|
| CN | 102037027 A | 4/2011 |
| CN | 104039843 A | 9/2014 |

(Continued)

OTHER PUBLICATIONS

Machine translation, KR 2018-0133641. (Year: 2018).*

(Continued)

*Primary Examiner* — Catherine S Branch
(74) *Attorney, Agent, or Firm* — Morgan, Lewis & Bockius LLP

(57) ABSTRACT

The present invention relates to a conjugated diene-based polymer having high processability and excellent compounding properties, a preparation method thereof and a rubber composition including same, and provides a neodymium-catalyzed conjugated diene-based polymer satisfying all conditions of (a) to (c), a preparation method thereof and a rubber composition including same.

8 Claims, 1 Drawing Sheet

(56) References Cited

U.S. PATENT DOCUMENTS

| | | | |
|---|---|---|---|
| 2014/0303327 | A1 | 10/2014 | McCauley et al. |
| 2016/0060437 | A1 | 3/2016 | Naito et al. |
| 2017/0275391 | A1 | 9/2017 | Kim et al. |
| 2019/0389987 | A1 | 12/2019 | Jeon et al. |
| 2020/0123288 | A1 | 4/2020 | Yoo et al. |
| 2020/0332089 | A1 | 10/2020 | Kanbara et al. |
| 2022/0010105 | A1 | 1/2022 | Oh et al. |
| 2022/0106421 | A1 | 4/2022 | Kuhel, III et al. |

FOREIGN PATENT DOCUMENTS

| | | | | |
|---|---|---|---|---|
| CN | 110366568 | A | 10/2019 | |
| EP | 3263608 | A1 * | 1/2018 | .......... C08F 297/046 |
| JP | 2001-139634 | A | 5/2001 | |
| JP | 2004-204229 | A | 7/2004 | |
| JP | 2010-126540 | A | 6/2010 | |
| JP | 2011-516642 | A | 5/2011 | |
| JP | 2017-535620 | A | 11/2017 | |
| KR | 10-1614293 | B1 | 4/2016 | |
| KR | 10-2016-0073924 | A | 6/2016 | |
| KR | 10-2017-0045299 | A | 4/2017 | |
| KR | 10-2017-0077485 | A | 7/2017 | |
| KR | 10-2018-0133641 | A | 12/2018 | |
| KR | 10-1963474 | B1 | 3/2019 | |
| KR | 10-2019-0046517 | A | 5/2019 | |
| KR | 10-2019-0046518 | A | 5/2019 | |
| KR | 10-2020-0040282 | A | 4/2020 | |
| KR | 10-2020-0072979 | A | 6/2020 | |
| KR | 10-2020-0078405 | A | 7/2020 | |
| WO | 2020/130740 | A1 | 6/2020 | |
| WO | 2020/160000 | A1 | 8/2020 | |

OTHER PUBLICATIONS

Extended European Search Report issued Nov. 6, 2023 for European Patent Application No. 21872930.9 (Note: KR 10-1963474 B1, KR 2018-0133641 A & WO 2020/130740 A1 were cited in prior IDS filings.).

Office Action issued Dec. 1, 2023 for corresponding Chinese Patent Application No. 202180011921.6 (Note: KR 2018-0133641 A was cited in a prior IDS.).

Office Action issued on Jun. 17, 2024 in corresponding Korean Patent Application 10-2021-0126216.

International Search Report (with partial translation) and Written Opinion dated Jan. 10, 2022, for corresponding International Patent Application No. PCT/KR2021/013011.

Extended European Search Report issued in application 21872930.9 dated Jul. 10, 2023.

Office Action issued in Japanese application 2022-548043 dated Jul. 25, 2023.

* cited by examiner

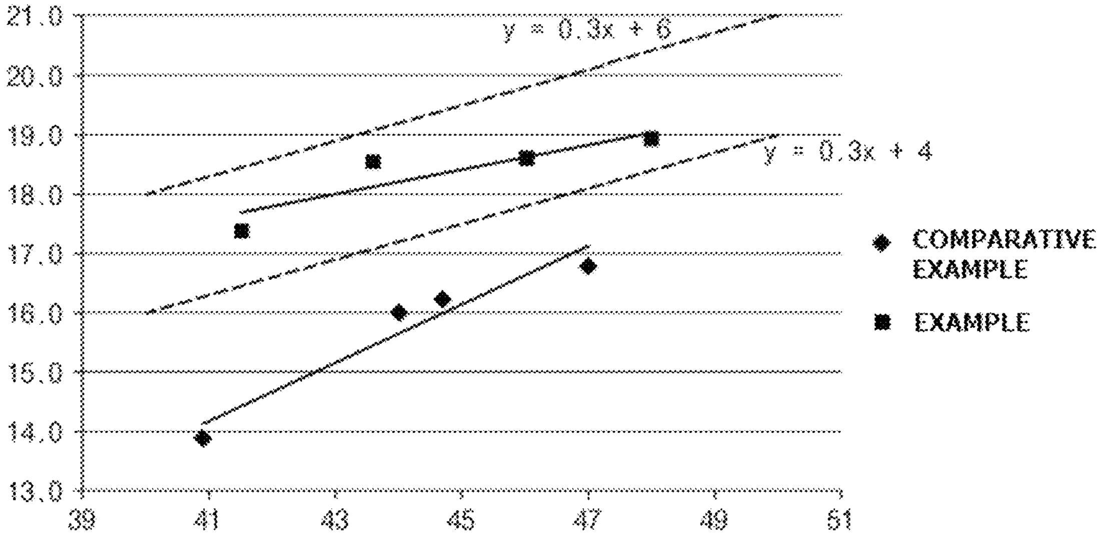
21.0
20.0
19.0
18.0
17.0
16.0
15.0
14.0
13.0
39
41
43
45
47
49
51
y = 0.3x + 6
y = 0.3x + 4
COMPARATIVE EXAMPLE
EXAMPLE

NEODYMIUM-CATALYZED CONJUGATED DIENE-BASED POLYMER AND RUBBER COMPOSITION COMPRISING SAME

CROSS-REFERENCE TO RELATED APPLICATIONS

The present application claims the benefit of priority based on Korean Patent Application No. 10-2020-0125164, filed on Sep. 25, 2020, the entire contents of which are incorporated herein by reference.

TECHNICAL FIELD

The present invention relates to a neodymium-catalyzed conjugated diene-based polymer having high processability and excellent compounding properties, and a rubber composition comprising same.

BACKGROUND ART

Recently, according to the growing attention on saving energy and environmental issues, the decrease of the fuel consumption ratio of cars is required. As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition including abrasion resistance, crack resistance or processability arise.

In order to solve such problems, a method of modifying the polymerization active moiety of a conjugated diene-based polymer which is obtained by anionic polymerization using an organolithium with a functional group which is capable of interacting with an inorganic filler, has been developed as a method for increasing the dispersibility of an inorganic filler such as silica and carbon black in a rubber composition. Particularly, a method of modifying the polymerization active terminal of a conjugated diene-based polymer with a tin-based compound, a method of introducing an amino group, or a method of modifying with an alkoxysilane derivative has been suggested.

However, if a rubber composition is prepared using the modified conjugated diene-based polymer which has been modified by the above-described methods, low heating properties may be secured, but the improving effects of the physical properties of a rubber composition such as abrasion resistance and processability were insufficient.

As another method, a method of modifying a living active terminal using a specific coupling agent or a modifier in a living polymer obtained by coordination polymerization using a catalyst including a lanthanide rare earth element compound has been developed. However, in the catalyst including the conventionally known lanthanide rare earth element compound, the activity of a living terminal produced is weak, a terminal modification ratio is low, and the improving effects of the physical properties of a rubber composition are insignificant.

PRIOR ART DOCUMENT (Patent Document 1) KR 10-2020-0078405 A

DISCLOSURE OF THE INVENTION

Technical Problem

An object of the present invention is to provide a conjugated diene-based polymer having high processability and excellent compounding properties, and a rubber composition including same.

Another object of the present invention is to provide a method for preparing the conjugated diene-based polymer.

Technical Solution

To solve the above-described tasks, there is provided in the present invention a neodymium-catalyzed conjugated diene-based polymer satisfying all the following conditions (a) to (c):

(a) a residual amount of a neodymium catalyst, measured by inductively coupled plasma (ICP) is less than 50 wtppm;

(b) a β-value is less than 0.20, where the β-value means a slope of a log(frequency)(x-axis)−log(1/tan δ)(y-axis) graph obtained from measured results of tan δ at 100° C. by a rubber process analyzer (RPA); and (c) the following Equation 1 is satisfied:

$$0.3X+4<Y<0.3X+6 \quad \text{[Equation 1]}$$

in Equation 1,

X is mooney viscosity (ML1+4, @100° C.), and

Y is a ratio (%) of a number of polymer chains having a molecular weight of 1,000,000 g/mol or more in contrast to a total number of polymer chains in a molecular weight distribution curve by gel permeation chromatography (GPC).

In addition, the present invention provides a method for preparing a neodymium-catalyzed conjugated diene-based polymer, comprising: (S1) a step of polymerizing a conjugated diene-based monomer in the presence of a catalyst composition comprising a neodymium compound, and a molecular weight controller in a first reactor of 85° C. or more in a polymerization conversion ratio of 80% or more to discharge a polymer product; and (S2) a step of transporting the polymer product to a second reactor and performing polymerization, wherein the neodymium compound in the catalyst composition is 0.01 to 0.03 mmol based on 100 g of the conjugated diene-based monomer, and the molecular weight controller is 0.01 to 0.20 phm.

Advantageous Effects

The neodymium-catalyzed conjugated diene-based polymer of the present invention has a high degree of branching and shows excellent affinity with a filler, and if applied to a rubber composition, dispersibility is high, and excellent processability may be shown. In addition, a molded product manufactured therefrom shows excellent physical properties including tensile strength, abrasion resistance, viscoelasticity properties, or the like.

BRIEF DESCRIPTION OF DRAWING

FIGURE is a graph of X and Y, defined in Equation 1 in conjugated diene-based polymers according to the Example of the present invention and the Comparative Example.

BEST MODE FOR CARRYING OUT THE INVENTION

Hereinafter, the present invention will be described in more detail in order to assist the understanding of the present invention.

It will be understood that words or terms used in the present invention and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Neodymium-Catalyzed Conjugated Diene-Based Polymer

The neodymium-catalyzed conjugated diene-based polymer of the present invention is characterized in satisfying: a residual amount of a neodymium catalyst, measured by inductively coupled plasma (ICP) is less than 50 wtppm; a β-value is less than 0.20, where the β-value means a slope of a log(frequency)(x-axis)−log(1/tan δ)(y-axis) graph obtained from measured results of tan δ at 100° C. by a rubber process analyzer (RPA); and Equation 1 below is satisfied.

$$0.3X+4<Y<0.3X+6 \qquad \text{[Equation 1]}$$

In Equation 1,

X is mooney viscosity (ML1+4, @100° C.), and

Y is a ratio (%) of a number of polymer chains having a molecular weight of 1,000,000 g/mol or more in contrast to a total number of polymer chains in a molecular weight distribution curve by gel permeation chromatography (GPC).

The neodymium-catalyzed conjugated diene-based polymer of the present invention may have optimized properties to have excellent processability and improved balance of physical properties including viscoelasticity properties, tensile properties and processability of a rubber composition, through the control of polymerization conditions including the amount of a neodymium compound, polymerization temperature and the amount of a molecular weight controller during preparation.

The neodymium-catalyzed conjugated diene-based polymer of the present invention may have the residual amount of a neodymium catalyst, measured by inductively coupled plasma (ICP) of less than 50 wtppm, particularly, 45 wtppm or less, 40 wtppm or less, and 20 wtppm or more. In this case, the wtppm is based on the neodymium-catalyzed conjugated diene-based polymer.

The residual amount of the neodymium catalyst of less than 50 wtppm means that the neodymium catalyst which remains in the conjugated diene-based polymer and is regarded as impurities, is contained in a small amount, and the conjugated diene-based polymer of the present invention is prepared while controlling the amount of a neodymium compound which is used as a catalyst small, and at the same time, the amount of a molecular weight controller large, which will be described later. Through this, the residual amount of the neodymium catalyst in the polymer becomes small, the catalyst amount used is low, and the molecular weight of a polymer is shown high, and improved mechanical properties are shown.

If the residual amount of the neodymium catalyst is 50 wtppm or more, the generation of the chain transfer of neodymium and aluminum at a chain terminal increases, and a polymer having a high molecular weight in contrast to mooney viscosity as the definition of the present may not be prepared, and excellent mechanical properties may not be achieved, neither. In addition, the chlorine content in the polymer increases, and the deterioration of physical properties such as discoloration may be generated in a final conjugated diene-based polymer.

The neodymium-catalyzed conjugated diene-based polymer of the present invention has a β-value of less than 0.20, where the β-value means a slope of a log(frequency)(x-axis)−log(1/tan δ)(y-axis) graph obtained from measured results of tan δ at 100° C. by a rubber process analyzer (RPA). Here, tan δ is an index representing general viscoelasticity properties and is a value represented by the ratio of viscous modulus (G") with respect to elastic modulus (G'). The β-value is less than 0.20, and may particularly be less than 0.200, 0.199 or less, 0.195 or less, and 0.160 or more, 0.170 or more, 0.175 or more.

Particularly, the β-value is the function of frequency and represents the degree of branching of a conjugated diene-based polymer. The decrease of the β-value means the increase of the degree of branching, and the increase of the β-value means the decrease of the degree of branching.

The conjugated diene-based polymer of the present invention has a high molecular weight and shows excellent mechanical properties, and is prepared at a high polymerization temperature, which will be explained later, and thus, has a small β-value and high degree of branching, as described above, and shows excellent processability.

The neodymium-catalyzed conjugated diene-based polymer of the present invention has the residual amount of the neodymium catalyst of less than 50 wtppm and the β-value of less than 0.20, and at the same time, satisfies Equation 1 below, as described above.

$$0.3X+4<Y<0.3X+6 \qquad \text{[Equation 1]}$$

In Equation 1,

X is mooney viscosity (ML1+4, @100° C.), and

Y is a ratio (%) of a number of polymer chains having a molecular weight of 1,000,000 g/mol or more in contrast to a total number of polymer chains in a molecular weight distribution curve by gel permeation chromatography (GPC).

As in Equation 1, the neodymium-catalyzed conjugated diene-based polymer of the present invention shows the high content of polymer chains having a high molecular weight (molecular weight of 1,000,000 g/mol or more) in contrast to mooney viscosity. This means that the polymer of the present invention contains polymer chains having a high molecular weight in a high ratio, and excellent mechanical properties may be achieved.

X in Equation 1, i.e., the mooney viscosity (ML1+4, @100° C.) may be 40 to 50, particularly, 40 or more, 41 or more, and 50 or less, 48 or less. The conjugated diene-based polymer according to the present invention has the mooney viscosity in the above-described range, and has improved mechanical properties in contrast to the conventional conjugated diene-based polymer having the equivalent level of mooney viscosity.

The mooney viscosity may be measured by means of a mooney viscometer, for example, MV2000E of Monsanto Co., using a large rotor at 100° C. at a rotor speed of 2±0.02 rpm. Particularly, a neodymium-catalyzed conjugated diene-based polymer is stood at room temperature (23±5° C.) for 30 minutes or more, and 27+3 g is collected and put in a die cavity, and then, the mooney viscosity may be measured by operating a platen.

Y in Equation 1, i.e., the ratio (%) of polymer chains having a molecular weight of 1,000,000 g/mol or more may be 15% or more, particularly, 15.0% or more, 16.0% or more, 16.5% or more, 17.0% or more, and considering the prevention of the deterioration of the processability due to the polymer chains having a high molecular weight, particularly, the ratio (%) may be 30.0% or less, 25.0% or less, 22.0% or less, 20.0% or less. Here, the ratio (%) of the number of the polymer chains having a molecular weight of 1,000,000 g/mol or more means the ratio (%) of the number of polymer chains having a molecular weight of 1,000,000 g/mol or more in contrast to a total number of polymer chains in a molecular weight distribution curve by gel permeation chromatography.

At the same time, the conjugated diene-based polymer of the present invention may have a weight average molecular weight of 500,000 to 1,200,000 g/mol, particularly, 600,000 g/mol or more, or 660,000 g/mol or more, 680,000 g/mol or more, and 1,200,000 g/mol or less, 1,000,000 g/mol or less, 800,000 g/mol or less. In addition, a number average molecular weight may be 200,000 to 350,000 g/mol, particularly, 210,000 g/mol or more, 220,000 g/mol or more, 230,000 g/mol or more, and 320,000 g/mol or less, 310,000 g/mol or less, 300,000 g/mol or less.

In addition, the conjugated diene-based polymer may have molecular weight distribution (MWD, Mw/Mn) of 1.5 to 3.5, particularly, 1.5 or more, 1.7 or more, 2.0 or more, 2.2 or more, 2.3 or more, and 3.5 or less, 3.2 or less, 3.0 or less, and if applied to a rubber composition, tensile properties and viscoelasticity properties may be improved.

Also, if applied to a rubber composition, the conjugated diene-based polymer according to an embodiment of the present invention may have the above-described molecular weight distribution range and satisfy the weight average molecular weight and number average molecular weight in the above-described ranges, simultaneously, so as to uniformly improve the mechanical properties, elasticity and processability of the rubber composition.

Here, the weight average molecular weight and the number average molecular weight are polystyrene conversion molecular weights, analyzed by GPC, and the molecular weight distribution (Mw/Mn) was calculated from the ratio (Mw/Mn) of the weight average molecular weight (Mw) and the number average molecular weight (Mn). In addition, the number average molecular weight is a common average of the molecular weights of individual polymers, which is obtained by measuring the molecular weights of n polymer molecules, obtaining the total of the molecular weights, and dividing the total by n, and the weight average molecular weight represents molecular weight distribution of a polymer.

In the present invention, the neodymium-catalyzed conjugated diene-based polymer may represent a conjugated diene-based polymer derived from a catalyst composition including a neodymium compound, that is, a conjugated diene-based polymer including an organometallic moiety activated from a catalyst. Particularly, the conjugated diene-based polymer may be a neodymium-catalyzed butadiene-based polymer including a repeating unit derived from a 1,3-butadiene monomer.

The activated organometallic moiety of the conjugated diene-based polymer may be an activated organometallic moiety at the terminal of a conjugated diene-based polymer (activated organometallic moiety at the terminal of a molecular chain), an activated organometallic moiety in a main chain, or an activated organometallic moiety in a side chain, and among them, in the case of obtaining the activated organometallic moiety of a conjugated diene-based polymer by anionic polymerization or coordination anionic polymerization, the activated organometallic moiety may be an activated organometallic moiety at a terminal.

As the conjugated diene-based monomer, any one used for preparing a common conjugated diene-based polymer may be used, without specific limitation. The conjugated diene-based monomer may particularly be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene or 2,4-hexadiene, and any one or a mixture of two or more thereof may be used. More particularly, the conjugated diene-based monomer may be 1,3-butadiene.

In addition, other monomers copolymerizable with the conjugated diene-based monomer may be further used, particularly, an aromatic vinyl monomer such as styrene, p-methylstyrene, α-methylstyrene, 1-vinylnaphthalene, 3-vinyltoluene, ethylvinylbenzene, divinylbenzene, 4-cyclohexylstyrene, and 2,4,6-trimethylstyrene may be used, and any one or a mixture of two or more thereof may be used. The other monomers may be used in an amount of 20 wt % or less based on the total weight of the monomers used in the polymerization reaction.

In a particular embodiment, the conjugated diene-based polymer may include 80 to 100 wt % of a repeating unit derived from a 1,3-butadiene monomer, and selectively, 20 wt % or less of a repeating unit derived from other conjugated diene-based monomers which are copolymerizable with 1,3-butadiene, and within the range, effects of not reducing the 1,4-cis bond content in a polymer may be obtained. In this case, as the 1,3-butadiene monomer, 1,3-butadiene or the derivatives thereof including 1,3-butadiene, 2,3-dimethyl-1,3-butadiene, and 2-ethyl-1,3-butadiene may be used, and as the other conjugated diene-based monomers which are copolymerizable with 1,3-butadiene, 2-methyl-1,3-pentadiene, 1,3-pentadiene, 3-methyl-1,3-pentadiene, 4-methyl-1,3-pentadiene, 1,3-hexadiene or 2,4-hexadiene may be used, and any one or a compound of two or more thereof may be used.

Preferably, the neodymium-catalyzed conjugated diene-based polymer of the present invention may be a neodymium-catalyzed butadiene polymer prepared by polymerizing 1,3-butadiene.

In the neodymium-catalyzed conjugated diene-based polymer of the present invention, the neodymium catalyst may include a neodymium compound, and particularly, the neodymium compound may be carboxylates (for example, neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.); organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.); organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.); organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.); carbamates (for example, neodymium dimethyl carbamate, neodymium diethyl carbamate, neodymium diisopropyl carbamate, neodymium dibutyl carbamate, neodymium dibenzyl carbamate, etc.); dithio carbamates (for example, neodymium dimethyldithio carbamate, neodymium diethyldithio carbamate, neodymium diisopropyl dithio carbamate, neodymium dibutyldithio carbamate, etc.); xanthogenates (for example, neodymium methyl xanthogenate, neodymium ethyl xanthogenate, neodymium isopropyl xanthogenate, neodymium butyl xanthogenate, neodymium benzyl xanthogenate, etc.); β-diketonates (for example, neodymium acetylacetonate, neodymium trifluoroacetyl acetonate, neodymium hexafluoroacetyl acetonate, neodymium benzoyl acetonate, etc.); alkoxides or allyloxides (for example, neodymium methoxide, neodymium ethoxide, neodymium isopropoxide, neodymium phenoxide, neodymium nonyl phenoxide, etc.); halides or pseudo halides (neodymium fluoride, neodymium chloride, neodymium bromide, neodymium iodide, neodymium cyanide, neodymium cyanate, neodymium thiocyanate, neodymium azide, etc.); oxyhalides (for example, neodymium oxyfluoride, neodymium oxychloride, neodymium oxybromide, etc.); or organic neodymium-containing compounds including one or more neodymium element-carbon bonds (for example, $Cp_3Nd$, $Cp_2NdR$, $Cp_2NdCl$, $CpNdCl_2$, CpNd(cyclooctatetraene), $(C_5Me_5)_2NdR$, $NdR_3$, $Nd(allyl)_3$, $Nd(allyl)_2Cl$, etc., where R is a hydrocarbyl group), etc., and may include any one or a mixture of two or more thereof.

More particularly, the neodymium catalyst may be a compound represented by Formula 1 below.

[Formula 1]

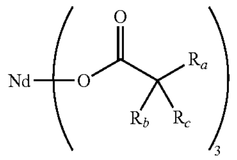

In Formula 1, $R_a$ to $R_c$ are each independently hydrogen or an alkyl group of 1 to 12 carbon atoms, where $R_a$ to $R_c$ are not hydrogen simultaneously.

In addition, considering excellent solubility in a solvent without fear of oligomerization and considering a conversion ratio into a catalyst species and consequent improving effects of catalyst activity, in Formula 1, $R_a$ may be an alkyl group of 4 to 12 carbon atoms, and $R_b$ and $R_c$ may be each independently hydrogen or an alkyl group of 1 to 8 carbon atoms.

More particularly, in Formula 1, $R_a$ may be an alkyl group of 6 to 10 carbon atoms, and $R_b$ and $R_c$ may be each independently hydrogen or an alkyl group of 1 to 4 carbon atoms.

More particularly, in Formula 1, $R_a$ may be an alkyl group of 8 to 10 carbon atoms, and $R_b$ and $R_c$ may be each independently hydrogen.

As described above, the neodymium compound represented by Formula 1 includes carboxylate ligands including alkyl groups with various lengths of 2 or more carbon atoms at an a (alpha) position as substituents, and steric change may be induced around a neodymium central metal to block tangling between compounds. Accordingly, effects of suppressing oligomerization may be achieved. In addition, such a neodymium compound has high solubility in a solvent, and the ratio of neodymium positioned at the central part, which has difficulty in conversion into a catalyst active species, is decreased to increase the conversion ratio into the catalyst active species.

More particularly, the neodymium compound may be one or more selected from the group consisting of $Nd(neodecanoate)_3$, $Nd(2\text{-ethylhexanoate})_3$, $Nd(2,2\text{-dimethyl decanoate})_3$, $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2-isopropyl decanoate})_3$, $Nd(2\text{-butyl-2-hexyl decanoate})_3$, $Nd(2\text{-hexyl-2-octyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl propyl nonanoate})_3$ and $Nd(2\text{-ethyl-2-hexyl nonanoate})_3$.

In addition, the neodymium compound may have a solubility of about 4 g or more per 6 g of a non-polar solvent at room temperature (23±5° C.). The solubility of the neodymium compound means the degree of clear dissolution without generating turbid phenomenon. Through showing such high solubility, excellent catalyst activity may be shown.

In addition, the neodymium compound may be used as a reaction product type with a Lewis base. Due to the Lewis base, the reaction product may attain improved solubility of the neodymium compound in a solvent and may attain the effects of stable storage for a long time. The Lewis base may be used in a ratio of, for example, 30 mol or less, or 1 to 10 mol per 1 mol of the neodymium element. The Lewis base may be, for example, acetyl acetone, tetrahydrofuran, pyridine, N,N-dimethylformamide, thiophene, diphenyl ether, triethylamine, organophosphorous compounds or monohydric or dihydric alcohols.

Method for Preparing Neodymium-Catalyzed Conjugated Diene-Based Polymer

The conjugated diene-based polymer of the present invention may be prepared by a preparation method including: (S1) a step of polymerizing a conjugated diene-based monomer in the presence of a catalyst composition including a neodymium compound, and a molecular weight controller in a first reactor of 85° C. or more in a polymerization conversion ratio of 80% or more to discharge a polymer product; and (S2) a step of transporting the polymer product to a second reactor and performing polymerization, wherein the neodymium compound in the catalyst composition is 0.01 to 0.03 mmol based on 100 g of the conjugated diene-based monomer, and the molecular weight controller is 0.01 to 0.20 phm.

The preparation method may be continuous polymerization using at least two or more reactors. Through using a small amount of the neodymium compound as a catalyst and a large amount of the molecular weight controller, the molecular weight of the neodymium-catalyzed conjugated diene-based polymer may be controlled, and mechanical properties may be improved, and through performing polymerization at a high temperature, the degree of branching may be increased to secure processability.

The catalyst composition may be used in an amount such that 0.01 to 0.03 mmol of the neodymium compound is used based on 100 g of the conjugated diene-based monomer, particularly, 0.01 mmol or more, 0.010 mmol or more, 0.015 mmol or more, 0.020 mmol or more, and 0.030 mmol or less based on 100 g of the conjugated diene-based monomer used for the polymerization of the neodymium compound.

After activating the neodymium compound by an alkylating agent which will be explained later, a catalyst active species for polymerizing a conjugated diene-based monomer is formed. The explanation on the neodymium catalyst is the same as described above.

If the neodymium compound is less than 0.01 mmol based on 100 g of the conjugated diene-based monomer, the neodymium compound is too small in contrast to the conjugated diene-based monomer, and polymerization reaction may not be performed well, and if the retention time is increased to perform the polymerization reaction further, the molecular weight distribution of the conjugated diene-based polymer increases, and degrading phenomenon of mechanical properties may be generated. If the neodymium compound is greater than 0.03 mmol based on 100 g of the conjugated diene-based monomer, the production costs of the conjugated diene-based polymer increase, and the chlorine content in a polymer prepared increases to induce defects which may arise quality deterioration such as the corrosion of production equipments and the discoloration of a product. In addition, a polymer having a high molecular weight in contrast to mooney viscosity as defined in the present invention, may not be prepared, and the accomplishment of excellent mechanical properties may become difficult.

The preparation method is performed under conditions using a molecular weight controller separately from the catalyst composition. The molecular weight controller may be 0.01 to 0.20 part hundred monomer (phm), particularly, 0.01 phm or more, 0.02 phm or more, 0.03 phm or more, 0.05 phm or more, and 0.20 phm or less, 0.15 phm or less, 0.10 phm or less. The phm represents parts by weight based on total 100 parts by weight of the conjugated diene-based monomer.

Through the molecular weight controller, the molecular weight of the polymer prepared may be easily controlled to a suitable level though using a small amount of the neodymium compound in the present invention, and a conjugated diene-based polymer having desired physical properties may be prepared. If the molecular weight controller deviates from the range, it is difficult to prepare a conjugated diene-based polymer having a high molecular weight using a small amount of a neodymium compound as in the present invention. The amount of the molecular weight controller is an amount for preparing an optimum conjugated diene-based polymer achieving both excellent compounding properties and processability with the polymerization temperature, polymerization conversion ratio and amount of the neodymium compound, defined in the present invention.

Particularly, in the present invention, in addition to the catalyst composition obtained by mixing a neodymium compound, a first alkylating agent, a second alkylating agent, a halogen compound and a conjugated diene-based monomer and aging, a separate molecular weight controller is injected, and polymerization is performed. In this case, the control of the molecular weight is even easier in contrast to a case of including the molecular weight controller in the catalyst composition, and the conjugated diene-based polymer showing a high molecular weight as in the present invention may be prepared.

Particularly, the molecular weight controller may be dihydrocarbylaluminum hydride or hydrocarbylaluminum dihydride, and particularly, the molecular weight controller may be dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride; or combinations thereof, without limitation.

More preferably, the molecular weight controller may be one or more selected from the group consisting of diethylaluminum hydride, di-n-propylaluminum hydride, diisopropylaluminum hydride, di-n-butylaluminum hydride and diisobutylaluminum hydride.

The molecular weight controller may not be mixed in the catalyst composition or form an active species, but may be injected during polymerization reaction as the molecular weight controller itself separately from the catalyst composition. Based on such meaning, the molecular weight controller may be used with differentiated meaning from the second alkylating agent included in the catalyst composition.

The catalyst composition may further include a first alkylating agent, a second alkylating agent, a halogen compound and a conjugated diene-based monomer, and may particularly be prepared by mixing a neodymium compound, a first alkylating agent, a second alkylating agent, a halogen compound and a conjugated diene-based monomer in an organic solvent. The mixing may be performed by stirring for 5 hours or more, 7 hours or more, 10 hours or more, 11 hours or more, and 20 hours or less.

In this case, the organic solvent may be a hydrocarbon solvent having no reactivity with the components constituting the catalyst composition. Particularly, the hydrocarbon solvent may be linear, branched or cyclic aliphatic hydrocarbon of 5 to 20 carbon atoms such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane and methylcyclohexane; a mixture solvent of aliphatic hydrocarbon of 5 to 20 carbon atoms such as petroleum ether, petroleum spirits, and kerosene; or an aromatic hydrocarbon-based solvent such as benzene, toluene, ethylbenzene, and xylene, and any one or a mixture of two or more thereof may be used. More particularly, the hydrocarbon solvent may be the linear, branched or cyclic aliphatic hydrocarbon of 5 to 20 carbon atoms or a mixture solvent of aliphatic hydrocarbon, and n-hexane, cyclohexane, or a mixture thereof, preferably, n-hexane may be used.

In this case, to promote the product of a catalyst active species, the mixing process may be performed by stirring at −30 to −20° C. for 5 hours or more, 7 hours or more, 10 hours or more, 11 hours or more, and 20 hours or less. In addition, after mixing, the catalyst composition may be stood for 24 to 36 hours.

The catalyst composition may be a mixture of the neodymium compound:first alkylating agent:second alkylating agent:halogen compound:conjugated diene-based monomer, a molar ratio of 1:(50 to 200):(30 to 70):(1 to 5):(10 to 50).

More particularly, based on 1 mol of the neodymium compound, the first alkylating agent may be 50 mol or more, 70 mol or more, 100 mol or more, 110 mol or more, and 200 mol or less, 150 mol or less, 130 mol or less, for example, 120 mol. Based on 1 mol of the neodymium compound, the second alkylating agent may be 30 mol or more, 35 mol or more, 40 mol or more, and 70 mol or less, 60 mol or less, 50 mol or less. Based on 1 mol of the neodymium compound, the halogen compound may be 1.0 mol or more, 1.5 mol or more, and 5.0 mol or less, 4.0 mol or less, 3.5 mol or less. Based on 1 mol of the neodymium compound, the conjugated diene-based monomer may be 10 mol or more, 20 mol or more, 25 mol or more, and 50 mol or less, 40 mol or less, 35 mol or less.

The first alkylating agent may be aluminoxane and may be prepared by reacting a trihydrocarbyl aluminum-based compound with water. Particularly, the aluminoxane may be a linear aluminoxane of Formula 2a below or a cyclic aluminoxane of Formula 2b below.

[Formula 2a]

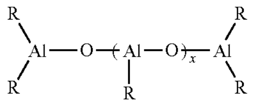

[Formula 2b]

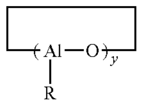

In Formulae 2a and 2b, R is a monovalent organic group which is combined with an aluminum atom via a carbon atom and may be a hydrocarbyl group, x and y may be each independently an integer of 1 or more, particularly, 1 to 100, and more particularly, an integer of 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of two thereof may be used.

In addition, the modified methylaluminoxane may be obtained by substituting the methyl group of the methylaluminoxane with a modifier (R), particularly, a hydrocarbon group of 2 to 20 carbon atoms, particularly, a compound represented by Formula 3 below.

[Formula 3]

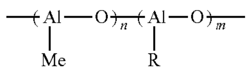

In Formula 3, R is the same as defined above, and m and n may be an integer of 2 or more. In addition, in Formula 3, Me means a methyl group.

Particularly, R in Formula 3 may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group or an alkynyl group of 2 to 20 carbon atoms, more particularly, an alkyl group of 2 to 10 carbon atoms such as an ethyl group, an isobutyl group, a hexyl group and an octyl group, even more particularly, an isobutyl group.

More particularly, the modified methylaluminoxane may be obtained by substituting about 50 mol % to 90 mol % of the methyl group of the methylaluminoxane with the hydrocarbon group. If the amount of the hydrocarbon group substituted in the modified methylaluminoxane is in the above-mentioned range, alkylation may be accelerated and catalyst activity may be increased.

Such modified methylaluminoxane may be prepared by a common method, particularly, prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

More preferably, the first alkylating agent may be methylaluminoxane, modified methylaluminoxane or a mixture of them.

The second alkylating agent may be dihydrocarbylaluminum hydride or hydrocarbylaluminum dihydride, and particularly, the second alkylating agent may be dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride; or combinations thereof, preferably, diisobutylaluminum hydride, without limitation.

More particularly, the second alkylating agent may be one or more selected from the group consisting of diethylaluminum hydride, di-n-propylaluminum hydride, diisopropylaluminum hydride, di-n-butylaluminum hydride and diisobutylaluminum hydride.

The alkylating agent is an organometallic compound which may transfer a hydrocarbyl group to another metal and may play the role of a cocatalyst.

In addition, the catalyst composition may further include a common alkylating agent used as an alkylating agent during preparing a common conjugated diene-based polymer, in addition to the first and second alkylating agents, as necessary, and such an alkylating agent may include alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; an alkylmagnesium compound such as diethylmagnesium, di-n-propylmagnesium, diisopropylmagnesium, dibutylmagnesium, dihexylmagnesium, diphenylmagnesium, and dibenzylmagnesium, and as an organolithium compound, an alkyllithium compound such as n-butyllithium may be used.

The halogen compound is not specifically limited but may be a diatomic halogen, an interhalogen compound, hydrogen halide, organic halide, nonmetal halide, metal halide, or organometallic halide, etc., and any one or a mixture of two or more thereof may be used. Among them, in consideration of the improvement of catalyst activity and consequent improving effects of reactivity, the halogen compound may be any one selected from the group consisting of an organic halide, a metal halide and an organometallic halide, or a mixture of at least two thereof.

The diatomic halogen may include fluorine, chlorine, bromine, or iodine.

In addition, the interhalogen compound may particularly include iodine monochloride, iodine monobromide, iodine trichloride, iodine pentafluoride, iodine monofluoride, iodine trifluoride, etc.

In addition, the hydrogen halide may include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide or selenium tetraiodide.

In addition, the metal halide may particularly include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

In addition, the organometallic halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition according to an embodiment of the present invention may include a non-coordinating anion-containing compound or a non-coordinating anion precursor compound instead of the halogen compound or together with the halogen compound.

Particularly, in the compound containing a non-coordinating anion, the non-coordinating anion may be an anion not forming a coordination bond with the active center of a catalyst system due to steric hindrance and having a sterically large volume, and may be a tetraarylborate anion or a tetraarylborate fluoride anion. In addition, the compound containing a non-coordinating anion may include a counter cation such as a carbonium cation such as a triaryl carbonium cation; an ammonium cation such as a N,N-dialkyl anilinium cation, and a phosphonium cation together with the non-coordinating anion. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, a triaryl boron compound ($BE_3$, where E is a strongly electron withdrawing aryl group such as a pentafluorophenyl group and a 3,5-bis(trifluoromethyl)phenyl group) may be used as a compound which is capable of forming a non-coordinating anion under reaction conditions.

More preferably, the halogen compound may be one or more selected from the group consisting of dimethylaluminum chloride, diethylaluminum chloride, methylaluminum dichloride, ethylaluminum dichloride, methylaluminum sesquichloride, ethylaluminum sesquichloride and isobutylaluminum sesquichloride.

By using the conjugated diene-based monomer in a performing catalyst composition type by which a portion of the conjugated diene-based monomer used in polymerization reaction is pre-mixed with a catalyst composition and prepolymerized, or a premix catalyst composition type, the conjugated diene-based polymer prepared may be stabilized as well as improving the activity of the catalyst composition.

The "preforming" in the present disclosure means that, if a catalyst composition including a neodymium compound, an alkylating agent and a halogen compound, that is, if a catalyst system includes diisobutylaluminum hydride (DIBAH), or the like, a small amount of a conjugated diene-based monomer such as 1,3-butadiene is added to reduce the production possibility of diverse catalyst composition active species, and pre-polymerization in a catalyst composition system is performed together with the addition of 1,3-butadiene, and this process is referred to as performing. In addition, the premix may mean a uniformly mixed state of each of the compounds without undergoing polymerization in a catalyst composition system.

In this case, the conjugated diene-based monomer used for the preparation of the catalyst composition may be used in a portion within the range of the total amount used of the conjugated diene-based monomer in the polymerization reaction.

In the present invention, in step (S1), a conjugated diene-based monomer is polymerized in a first reactor of 85° C. or more in a polymerization conversion ratio of 80% or more and discharged, and the polymer product is transported to a second reactor.

The polymerization conversion ratio represents the degree of conversion of the monomer component used for the polymerization reaction into a polymer, and is represented by the ratio of the monomer remaining in the polymer in contrast to the monomer weight firstly used in the polymerization reaction.

Since the polymerization temperature and the polymerization conversion ratio in the first reactor determine the conditions at the beginning of the reaction, and the polymerization of the monomer is actively performed under the most conditions in the first reactor, the polymerization temperature and the polymerization conversion ratio become important factors determining the physical properties of the conjugated diene-based polymer. Accordingly, though the number of the reactors used in the preparation method of the present invention is not limited, the polymerization temperature and the polymerization conversion ratio in the first reactor have been specified.

In the present invention, the temperature of the first reactor may be 85° C. or more, and 100° C. or less, 95° C. or less, 90° C. or less.

If the temperature of the first reactor is less than 85° C., it is apprehended that the polymerization reaction rate and efficiency may be deteriorated. In addition, in the present invention, by inducing the branching of a conjugated diene-based polymer by raising the polymerization temperature, a conjugated diene-based polymer showing a β-value of less than 0.20 may be prepared as defined in the present invention, and accordingly, compounding processability is shown excellent. If the temperature of the first reactor is less than 85° C., such effects could not be achieved.

In order to satisfy the polymerization conversion ratio, the preparation method of the present invention may be performed in the first reactor for 30 to 100 minutes, particularly, 30 minutes or more, 35 minutes or more, and 100 minutes or less, 50 minutes or less, 45 minutes or less, for example, for 40 minutes.

Following the first reactor, the polymerization is additionally performed in the second reactor, and the SCB formation due to the increase of the temperature and the reduction phenomenon of physical properties due to over-polymerization may be generated. In respect of preventing such defects, preferably, the polymerization in the second reactor may be performed until a polymerization conversion ratio reaches 95% or more, at the most, 100%, at a temperature of 10 to 100° C. for 10 to 60 minutes.

In addition, the polymerization may be polymerization with heating, isothermal polymerization, or polymerization at a constant temperature (adiabatic polymerization).

Here, the polymerization at a constant temperature may mean a polymerization method including a step of polymerizing using self-generated heat of reaction without arbitrarily applying heat after injecting a catalyst composition, and the polymerization with heating may mean a polymerization method including injecting the catalyst composition and then, increasing the temperature by arbitrarily applying heat. The isothermal polymerization may mean a polymerization method by which the temperature of a polymer is kept constant by increasing heat by applying heat or taking heat after adding the catalyst composition.

In the present invention, through steps (S1) and (S2), an active polymer including an organometallic moiety as the polymer of a conjugated diene-based monomer may be prepared. The organometallic moiety may be an activated organometallic moiety at the terminal of a polymer (activated organometallic moiety at the terminal of a molecular chain), an activated organometallic moiety in a main chain, or an activated organometallic moiety in a side chain (branched chain), and among them, if the activated organometallic moiety of a polymer is obtained by anionic polymerization or coordination anionic polymerization, the organometallic moiety may represent the activated organometallic moiety at the terminal.

The polymerization may be performed by radical polymerization or by various polymerization methods including bulk polymerization, solution polymerization, suspension polymerization or emulsion polymerization, and may be performed by a batch method, a continuous method or a semi-continuous method. In a particular embodiment, the polymerization for preparing the active polymer may be performed by injecting a conjugated diene-based monomer to the catalyst composition and reacting in an organic solvent.

In the present invention, after preparing the active polymer, a step of finishing the polymerization by using an additive such as a reaction quenching agent for finishing polymerization reaction such as polyoxyethylene glycol phosphate and an antioxidant such as 2,6-di-t-butylpara-cresol, may be further included. In addition, additives generally serving easy solution polymerization, particularly, additives such as a chelating agent, a dispersant, a pH controlling agent, a deoxidizer, and an oxygen scavenger may be selectively further used.

Meanwhile, the preparation method of the conjugated diene-based polymer may include a modification reaction step for modifying at least one terminal of the active polymer.

Particularly, the preparation method may include a modification reaction step for reacting or coupling the active polymer with a modifier to modify at least one terminal of the active polymer after polymerization.

In this case, the modifier may use a compound which may provide at least one terminal of the active polymer with a functional group or increase the molecular weight by coupling, for example, a compound including one or more functional groups selected from an azacyclopropane group, a ketone group, a carboxyl group, a thiocarboxyl group, a carbonate, a carboxylic anhydride, a metal carboxylate, an oxyhalide, an urea group, a thiourea group, an amide group, a thioamide group, an isocyanate group, a thioisocyanate group, a halogenated isocyano group, an epoxy group, a thioepoxy group, an imine group and a M-Z bond (where M is selected from Sn, Si, Ge and P, and Z is a halogen atom), and excluding an active proton and an onium salt.

The modifier may be used in 0.5 to 20 mol based on 1 mol of the neodymium compound in the catalyst composition. Particularly, the modifier may be used in 1 to 10 mol based on 1 mol of the neodymium compound in the catalyst composition. In addition, the modification reaction may be performed at 0 to 90° C. for 1 minute to 5 hours.

After finishing the modification reaction, the polymerization reaction may be quenched by adding an isopropanol solution of 2,6-di-t-butyl-p-cresol (BHT) to a polymerization reaction system. Then, through desolvation treatment such as steam stripping lowering the partial pressure of a solvent by supplying vapor or vacuum drying treatment, a conjugated diene-based polymer may be obtained. In addition, in the reaction product obtained from the results of the modification reaction, unmodified active polymer may be included together with the modified conjugated diene-based polymer.

Further, the conjugated diene-based polymer of the present invention may be applied to a rubber composition including the same and a molded product manufactured from the rubber composition.

The rubber composition may include the conjugated diene-based polymer in an amount of 0.1 wt % or more, 10 wt % or more, 20 wt % or more, and 100 wt % or less, 90 wt % or less. If the amount of the conjugated diene-based polymer is less than 0.1 wt %, the improving effects of the abrasion resistance and crack resistance of a molded product manufactured using the rubber composition, for example, a tire, may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based copolymer.

The rubber component may be a natural rubber or a synthetic rubber, for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene polymer (SBR), a polybutadiene (BR), a polyisoprene (IR), a butyl rubber (IIR), an ethylene-propylene polymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 150 parts by weight of a filler with respect to 100 parts by weight of the conjugated diene-based polymer, and the filler may be a silica-based filler, carbon black or a combination thereof. Particularly, the filler may be carbon black.

The carbon black-based filler is not specifically limited but may have a nitrogen adsorption specific surface area of, for example, 20 $m^2/g$ to 250 $m^2/g$ (measured based on N2SA, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2/g$, the processability of the rubber composition may be deteriorated, and if the nitrogen adsorption specific surface area of the carbon black is less than 20 $m^2/g$, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silicate), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, N2SA) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area of the silica is less than 120 $m^2/g$, the reinforcing performance due to silica may be deteriorated, and if the nitrogen absorption specific surface area of the silica is greater than 180 $m^2/g$, the processability of the rubber composition may be deteriorated. In addition, if the CTAB absorption specific surface area of the silica is less than 100 $m^2/g$, the reinforcing performance by the silica filler may be deteriorated, and if the CTAB absorption specific surface area of the silica is greater than 200 $m^2/g$, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide Or 3-trimethoxysilylpropylbenzothiazyltetrasulfide in consideration of the improving effect of reinforcing properties.

In addition, the rubber composition according to an embodiment of the present invention may be sulfur crosslinkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives commonly used in rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 2,2,4-trimethyl-1,2-dihydroquinoline, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition of the present invention may be obtained by mixing using a mixing apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful for the manufacture of each member of a tire such as a tire tread, an under tread, a side wall, a carcass coating rubber, a belt coating rubber, a bead filler, a chafer, and a bead coating rubber, or for the manufacture of rubber products in various industries such as a vibration-proof rubber, a belt conveyor, and a hose.

The molded product manufactured using the rubber composition may include tires or tire treads.

EXAMPLES

Hereinafter, the present invention will be explained in more detail referring to embodiments. However, the embodiments below are only for illustrating the present invention, and the scope of the present invention is not limited thereto.

Preparation of Catalyst Composition

Preparation Example 1

Under nitrogen conditions, to a hexane solvent, neodymium versatate (NdV) was added, and methylaluminoxane (MAO) as a first alkylating agent, diisobutylaluminum hydride (DIBAH) as a second alkylating agent, diethylaluminum chloride (DEAC) as a halogen compound and 1,3-butadiene (BD) were injected in order so as to satisfy the molar ratio of NdV:MAO:DIBAH:DEAC: 1,3-butadiene=1:120:43:2-3:30, followed by mixing at −20° C. for 12 hours to prepare a catalyst composition. The catalyst composition thus prepared was stored under nitrogen conditions at −30 to −20° C. for 24 hours and then, used.

Example 1

A conjugated diene-based polymer was prepared using a polymerization reactor in which two 80 L, stainless reactors provided with agitators and jackets were connected in series.

While maintaining the first reactor to 85° C. and 0-3 bar, polymerization was performed for 40 minutes while injecting hexane (42.18 kg/h), 1,3-butadiene (11.67 kg/h), the catalyst composition of Preparation Example 1 (NdV in the catalyst composition: 0.025 mmol/100 g BD), and DIBAH (0.079 phm) as a molecular weight controller, through the top of the first reactor. At a point where a polymerization conversion ratio reached 80% or more, the polymer product was transported to a second reactor maintaining 85° C., and polymerization was additionally performed for 15 minutes.

Then, a hexane solution containing 1.0 g of a polymerization quenching agent and a hexane solution containing 2.0 g of an antioxidant were added to quench the reaction, the solvent was removed through steam stripping, and drying was conducted using a hot roll to prepare a conjugated diene-based polymer.

Examples 2 to 4, and Comparative Examples 1 to 5

Conjugated diene-based polymers were prepared by performing the same method described in Example 1 except for changing the polymerization conditions as in Table 1 below.

TABLE 1

| | Example | | | | Comparative Example | | | | |
|---|---|---|---|---|---|---|---|---|---|
| Division | 1 | 2 | 3 | 4 | 1 | 2 | 3 | 4 | 5 |
| Nd (mmol/100 g BD) | 0.025 | 0.025 | 0.025 | 0.025 | 0.05 | 0.05 | 0.05 | 0.05 | 0.05 |
| DIBAH (phm) | 0.079 | 0.090 | 0.087 | 0.091 | 0.012 | 0.010 | 0.018 | 0.008 | 0.018 |

TABLE 1-continued

| | Example | | | | Comparative Example | | | | |
|---|---|---|---|---|---|---|---|---|---|
| Division | 1 | 2 | 3 | 4 | 1 | 2 | 3 | 4 | 5 |
| First reactor temp (° C.) | 85 | 90 | 85 | 87 | 80 | 80 | 80 | 80 | 85 |
| Second reactor temp (° C.) | 85 | 85 | 85 | 85 | 80 | 80 | 80 | 80 | 85 |

Experimental Example 1

(1) Residual Amount of Neodymium Catalyst (Nd)

0.08 g of a conjugated diene-based polymer was put in a vial, and 2 mL of concentrated sulfuric acid was added thereto, followed by heating and carbonizing on a hot plate. Then, in the heated state, 0.02 g of concentrated sulfuric acid was added, and this process was repeated until the color of the solution became pale yellow. If the height of a specimen remained to about 2 mm, the heating was stopped, and the temperature was reduced to room temperature. Then, 1 mL of concentrated nitric acid was added, and 0.02 g of hydrogen peroxide was added to decompose. To the specimen thus prepared, 200 μL of 1000 mg/kg internal standard Sc was added, the specimen was diluted with 20 mL of ultra pure water, and the neodymium content in the specimen was measured using ICP-OES (Optima 8300DV).

(2) GPC Analysis

The conjugated diene-based polymer was dissolved in tetrahydrofuran (THF) for 30 minutes under 40° C. conditions, and then loaded on gel permeation chromatography and flown. In this case, two columns of PLgel Olexis and one column of PLgel mixed-C(trade name of Polymer Laboratories Co.) were used in combination. Also, newly replaced columns were all mixed bed type columns, and polystyrene was used as a standard material of the gel permeation chromatography.

A weight average molecular weight (Mw, g/mol), a number average molecular weight (Mn, g/mol) and a molecular weight distribution (MWD) value were confirmed. In addition, log(MW) vs cumulative % were obtained using EMPOWER3 as a GPC software, and in this case, the polymer chain content with a molecular weight of 1,000,000 g/mol or more was calculated by the cumulative % of log(MW)=6.

(3) Mooney Viscosity (MV)

The mooney viscosity (ML1+4, @100° C.) was measured by means of MV2000E of Monsanto Co. using a large rotor at 100° C. at a rotor speed of 2±0.02 rpm conditions for each conjugated diene-based polymer. In this case, a specimen used was stood at room temperature (23±5° C.) for 30 minutes or more, and 27±3 g of the specimen was collected and put in a die cavity, and then, a platen was operated, and the mooney viscosity was measured while applying torque.

(4) Beta Value (β-Value)

The beta value (β-value) was measured using a measurement method developed by The Goodyear Tire & Rubber Company.

As a measurement apparatus, Rubber Process Analyzer (RPA2000, AlphaTechnologies Co.) was used. Particularly, frequency sweep was performed with strain of 7% at 100° C. conditions for each polymer. In this case, the frequency was set to 2, 5, 10, 20, 50, 100, 200, 500, 1,000, 2,000 cpm, and a slope of log(tan δ) vs log(frequency) was obtained as the beta value.

TABLE 2

| | | Example | | | | Comparative Example | | | | |
|---|---|---|---|---|---|---|---|---|---|---|
| Division | | 1 | 2 | 3 | 4 | 1 | 2 | 3 | 4 | 5 |
| Nd (ppm) | | 39 | 39 | 39 | 39 | 73 | 73 | 73 | 73 | 73 |
| GPC analysis | Chain with 1,000,000 or more (%) | 18.9 | 18.6 | 18.6 | 17.4 | 16.0 | 16.2 | 13.9 | 16.8 | 16.0 |
| | Mw ($\times 10^5$) | 7.23 | 7.36 | 7.36 | 6.82 | 6.50 | 6.37 | 5.86 | 6.57 | 6.45 |
| | Mn ($\times 10^5$) | 2.88 | 2.73 | 2.73 | 2.40 | 2.76 | 2.61 | 2.50 | 2.74 | 2.75 |
| | MWD | 2.50 | 2.70 | 2.70 | 2.84 | 2.40 | 2.40 | 2.30 | 2.40 | 2.34 |
| MV (X) | | 48 | 46 | 44 | 42 | 44 | 45 | 41 | 47 | 44 |
| 0.3X + 4 | | 18.4 | 17.8 | 17.2 | 16.6 | 17.2 | 17.5 | 16.3 | 18.1 | 17.2 |
| 0.3X + 6 | | 20.4 | 19.8 | 19.2 | 18.6 | 19.2 | 19.5 | 18.3 | 20.1 | 19.2 |
| β-value | | 0.192 | 0.180 | 0.195 | 0.184 | 0.205 | 0.210 | 0.209 | 0.216 | 0.190 |

As shown in Table 2 above, the conjugated diene-based polymers of the Examples according to the present invention showed the residual amounts of the neodymium catalyst, the beta values, and the polymer chain contents with a molecular weight of 1,000,000 g/mol or more, in the defined ranges of the present invention.

Meanwhile, in Comparative Examples 1 to 5, excessive amounts of the neodymium compound than the numerical range defined in the present invention were used, in Comparative Examples 1 to 4, the temperature of the first reactor was less than 85° C., and in Comparative Example 4, the molecular weight controller was used in a small amount which was deviated from the range of the present invention. If the conjugated diene-based polymers were prepared by such preparation methods, a conjugated diene-based polymer satisfying all of the residual amount of the neodymium catalyst, the beta value, and the polymer chain content with a molecular weight of 1,000,000 g/mol or more, in the ranges of the present invention, could not be prepared.

Experimental Example 2

To compare and analyze the physical properties of rubber compositions including the conjugated diene-based polymers prepared in the Examples and Comparative Examples, and molded products manufacture therefrom, a rubber specimen was prepared as follows.

Particularly, to 100 parts by weight of each conjugated diene-based polymer, 70 parts by weight of carbon black, 22.5 parts by weight of a process oil, 2 parts by weight of an antiaging agent (TMDQ), 3 parts by weight of zinc oxide (ZnO), and 2 parts by weight of stearic acid were compounded to prepare a first compound master batch (CMB). Then, to each rubber composition, 2 parts by weight of sulfur, 2 parts by weight of a vulcanization accelerator (CZ) and 0.5 parts by weight of a vulcanization accelerator (DPG) were added and gently mixed at 50° C. for 1.5 minutes in 50 rpm. Then, by using a roll of 50° C., a vulcanized compound master batch having a sheet shape was obtained. The vulcanized compound master batch thus obtained was vulcanized at 160° C. for 25 minutes to manufacture a rubber specimen (final mater batch, FMB).

(1) Processability

The mooney viscosities of the first compound master batch (CMB) and rubber specimen (FMB) were measured by the same method as in Experimental Example 1. The processability was shown by calculating the difference (ΔMV, FMB-RP) between the mooney viscosity of each polymer (RP) and the mooney viscosity of the rubber specimen (FMB), and the small mooney viscosity difference represents excellent processability.

(2) Vulcanization Properties

By using a moving die rheometer (MDR), the minimum torque (ML), maximum torque (MH), consumed time until 50% vulcanization (t50), consumed time until 90% vulcanization (t90), consumed time until 1% vulcanization (ts1), and consumed time until 2% vulcanization (ts2) during vulcanizing at 150° C. for 50 minutes, were measured.

With respect to a MH value, the increase of the value means the increase of a crosslinking degree. A t value is a factor relevant to a crosslinking rate, and for example, the small t90 means rapid crosslinking rate.

(3) Tensile Properties

For the rubber composition, after vulcanizing at 150° C. for t90 minutes, modulus when stretched by 300% (M-300, 300% modulus, kg·f/cm$^2$), tensile strength (T/S, tensile strength, kg·f/cm$^2$), and elongation were measured according to ASTM D412.

(4) Viscoelasticity Properties

A dynamic mechanical analyzer of TA Co. was used. Deformation was changed at each measurement temperature (50-70° C.) with a twist mode and a frequency of 10 Hz, and a tan δ value was measured. If the tan δ value at a high temperature (50-70° C.) decreases, hysteresis loss decreases, and low rotation resistance, i.e., a fuel consumption ratio becomes better.

TABLE 3

| Division | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| MV | RP | 48 | 46 | 44 | 42 | 44 | 45 | 41 | 47 | 44 |
| | CMB | 63 | 61 | 57 | 56 | 62 | 65 | 58 | 67 | 59 |
| | FMB | 62 | 60 | 57 | 56 | 62 | 64 | 58 | 67 | 59 |
| | ΔMV (FMB-RP) | 14 | 14 | 13 | 15 | 18 | 19 | 17 | 20 | 15 |
| Vulcanization properties | ML | 3.5 | 3.4 | 3.2 | 3.3 | 3.5 | 3.8 | 3.2 | 3.8 | 3.3 |
| | MH | 25.1 | 25.3 | 24.9 | 24.3 | 25.2 | 24.8 | 24.6 | 24.8 | 25.0 |
| | t50 | 9.1 | 9.1 | 9.2 | 9.3 | 9.2 | 8.7 | 9.2 | 8.5 | 9.1 |
| | t90 | 13.8 | 13.7 | 13.6 | 13.8 | 13.9 | 12.3 | 13.9 | 12.4 | 13.6 |
| | ts1 | 3.4 | 3.4 | 3.6 | 3.7 | 3.5 | 3.6 | 3.6 | 3.2 | 3.6 |
| | ts2 | 5.4 | 5.5 | 5.7 | 5.8 | 5.5 | 5.3 | 5.7 | 5.0 | 5.6 |
| Tensile properties | M-200 | 49 | 50 | 49 | 48 | 46 | 45 | 46 | 45 | 48 |
| | M-300 | 91 | 91 | 89 | 87 | 85 | 84 | 84 | 86 | 88 |
| | Tensile strength | 195 | 192 | 189 | 186 | 183 | 184 | 178 | 185 | 177 |
| | Elongation | 574 | 556 | 577 | 548 | 533 | 546 | 537 | 521 | 530 |
| Viscoelasticity properties | Tan δ at 50-70° C. | 0.166 | 0.168 | 0.167 | 0.168 | 0.172 | 0.171 | 0.174 | 0.171 | 0.172 |

As shown in Table 3 above, the conjugated diene-based polymers of the Examples prepared according to the present invention showed excellent tensile properties and viscoelasticity properties as well as processability.

On the contrary, the conjugated diene-based polymers of the Comparative Examples, unsatisfying the residual amount of the neodymium catalyst, the beta value, and the polymer chain content with a molecular weight of 1,000,000 g/mol or more, in the ranges of the present invention, were found to show reduced tensile properties and viscoelasticity properties.

As described above, if the residual amount of the neodymium catalyst is small, and a molecular weight and a beta value in specific ranges are shown, according to the present invention, it could be found that the processability and compounding properties of a conjugated diene-based polymer are achieved excellent.

The invention claimed is:

1. A neodymium-catalyzed conjugated diene-based polymer satisfying the following conditions (a) to (c):

(a) a residual amount of a neodymium catalyst, measured by inductively coupled plasma (ICP) is from 20 to less than 45 wtppm;

(b) a β-value is less than 0.20, where the β-value is a slope of a log(frequency)(x-axis)–log(1/tan δ)(y-axis) graph obtained from measured results of tan δ at 100° C. by a rubber process analyzer (RPA); and (c) the following Equation 1 is satisfied:

$$0.3X+4<Y<0.3X+6 \quad \text{[Equation 1]}$$

in Equation 1,

X is mooney viscosity (ML1+4, @100° C.), and

Y is a ratio (%) of a number of polymer chains having a molecular weight of 1,000,000 g/mol or more based on a total number of polymer chains in a molecular weight distribution curve by gel permeation chromatography (GPC), wherein, in condition (c), X is 40 to 50.

2. The neodymium-catalyzed conjugated diene-based polymer of claim 1, wherein, in the condition (b), the β-value is from 0.160 to 0.199.

3. The neodymium-catalyzed conjugated diene-based polymer of claim 1, wherein the neodymium catalyst is a compound represented by the following Formula 1:

[Formula 1]

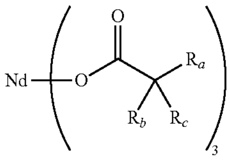

in Formula 1, $R_a$ to $R_c$ are each independently hydrogen or an alkyl group of 1 to 12 carbon atoms, where $R_a$ to $R_c$ are not hydrogen, simultaneously.

4. The neodymium-catalyzed conjugated diene-based polymer of claim 3, wherein $R_a$ is an alkyl group of 4 to 12 carbon atoms, and $R_b$ and $R_c$ are each independently hydrogen or an alkyl group of 1 to 8 carbon atoms.

5. The neodymium-catalyzed conjugated diene-based polymer of claim 1, wherein a weight average molecular weight is 500,000 to 1,200,000 g/mol.

6. The neodymium-catalyzed conjugated diene-based polymer of claim 1, wherein molecular weight distribution is 1.5 to 3.5.

7. A rubber composition comprising the neodymium-catalyzed conjugated diene-based polymer of claim 1.

8. The neodymium-catalyzed conjugated diene-based polymer of claim 1, wherein the residual amount of the neodymium catalyst is from 20 to 40 wtppm.

* * * * *